(12) United States Patent
Di Paola et al.

(10) Patent No.: US 11,578,599 B2
(45) Date of Patent: Feb. 14, 2023

(54) ROTOR BALANCE ASSEMBLY

(71) Applicant: PRATT & WHITNEY CANADA CORP., Longueuil (CA)

(72) Inventors: Franco Di Paola, Montreal (CA); Othmane Leghzaouni, Brossard (CA); Thierry Stocco, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/165,247

(22) Filed: Feb. 2, 2021

(65) Prior Publication Data

US 2022/0243593 A1 Aug. 4, 2022

(51) Int. Cl.
*F01D 5/02* (2006.01)
*F01D 5/06* (2006.01)
*G01M 1/32* (2006.01)

(52) U.S. Cl.
CPC ............. *F01D 5/027* (2013.01); *F01D 5/025* (2013.01); *F01D 5/066* (2013.01); *F05D 2260/30* (2013.01); *G01M 1/32* (2013.01)

(58) Field of Classification Search
CPC ........... F01D 5/027; G01M 1/32; G01M 1/34; F04D 29/662; F16F 15/32; F16F 15/322; F16F 15/324; F16F 15/34
See application file for complete search history.

(56) References Cited

U.S. PATENT DOCUMENTS 3,765,795 A * 10/1973 Koff .................. F01D 5/066
416/198 A
4,220,055 A * 9/1980 Dubois ................ F01D 5/027
464/180
4,803,893 A * 2/1989 Bachinski ............ F16F 15/322
74/574.2

(Continued)

FOREIGN PATENT DOCUMENTS

DE 102008016329 A1 * 10/2009 ............. F01D 5/027
EP 1445422 A2 9/2004

(Continued)

OTHER PUBLICATIONS

DE-102008016329—Translation from Espacenet (Year: 2009).*
European Search Report issued in counterpart application 22154633.6 dated May 4, 2022.

*Primary Examiner* — Richard A Edgar
*Assistant Examiner* — Behnoush Haghighian
(74) *Attorney, Agent, or Firm* — Norton Rose Fulbright Canada LLP

(57) ABSTRACT

A rotor assembly comprises a rotor having annular flange including a plurality of protrusions axisymmetrically disposed about the annular flange, each protrusion having a mounting aperture for selectively receiving a balancing feature, and a plurality of slots axisymmetrically disposed about the circumference of the annular flange between adjacent protrusions. Each slot has a pair of converging flat portions extending axially inwardly from an adjacent protrusion end, an inner flat portion at an inner end of each slot, (Continued)

and a pair of curved portions respectively joining each converging flat portion to the inner flat portion in each slot. Each slot has a depth at least as great as an adjacent mounting aperture depth extending normally from the adjacent protrusion end to a far end of the corresponding mounting aperture.

14 Claims, 7 Drawing Sheets

(56) References Cited

U.S. PATENT DOCUMENTS

| | | | | |
|---|---|---|---|---|
| 4,817,455 A * | 4/1989 | Buxe | ................ | F01D 5/027 416/500 |
| 4,879,792 A * | 11/1989 | O'Connor | ............ | F16F 15/322 29/889 |
| 5,388,963 A * | 2/1995 | Dimmick, III | ........ | F16B 33/002 416/198 A |
| 5,582,077 A * | 12/1996 | Agram | ................ | F01D 5/027 403/348 |
| 6,893,222 B2 * | 5/2005 | Allam | ................ | B23P 6/002 29/402.06 |
| 7,364,402 B2 * | 4/2008 | Brault | ................ | F01D 5/066 415/9 |
| 7,377,749 B2 * | 5/2008 | Charrier | ................ | F16F 15/34 416/119 |
| 7,491,031 B2 * | 2/2009 | Brault | ................ | F01D 5/027 416/119 |
| 8,025,483 B2 * | 9/2011 | Blanchard | ............ | F01D 5/027 416/500 |
| 8,070,445 B2 * | 12/2011 | Blanchard | ............ | F04D 29/662 416/144 |
| 8,186,954 B2 * | 5/2012 | Lee | ................ | F01D 5/027 416/144 |
| 8,328,519 B2 * | 12/2012 | Denis | ................ | F01D 5/027 416/162 |
| 8,342,804 B2 * | 1/2013 | Pronovost | ................ | F01D 5/02 416/182 |
| 8,348,616 B2 * | 1/2013 | Williams | ................ | F01D 5/027 416/119 |
| 8,353,670 B2 * | 1/2013 | Glasspoole | ............ | F01D 25/04 416/500 |
| 8,506,253 B2 * | 8/2013 | Lecuyer | ................ | F01D 5/10 416/145 |
| 8,631,578 B2 * | 1/2014 | Glasspoole | ............ | F01D 5/027 29/889 |
| 8,727,719 B2 * | 5/2014 | Belmonte | ................ | F01D 5/066 415/209.2 |
| 8,888,442 B2 * | 11/2014 | Bharath | ................ | F01D 9/041 415/138 |
| 8,888,458 B2 * | 11/2014 | Billings | ................ | F04D 29/662 416/144 |
| 9,039,351 B2 * | 5/2015 | Belmonte | ................ | F01D 25/243 415/119 |
| 9,127,556 B2 * | 9/2015 | Pronovost | ................ | F01D 5/027 |
| 9,297,258 B2 * | 3/2016 | Woods | ................ | F01D 5/027 |
| 9,511,457 B2 * | 12/2016 | Stone | ................ | B23P 15/02 |
| 9,920,626 B2 * | 3/2018 | Casaliggi | ................ | F16F 15/32 |
| 10,323,519 B2 * | 6/2019 | Porter | ................ | F01D 5/066 |
| 10,364,688 B2 * | 7/2019 | Hummel | ................ | F01D 5/027 |
| 10,392,940 B2 * | 8/2019 | Mariano | ................ | F01D 11/001 |
| 10,436,032 B2 * | 10/2019 | Pankratov | ................ | F02C 3/04 |
| 10,502,061 B2 * | 12/2019 | Pankratov | ................ | F01D 5/10 |
| 2004/0156708 A1 * | 8/2004 | Allam | ................ | F16F 15/34 415/144 |
| 2010/0080705 A1 * | 4/2010 | Pronovost | ................ | F01D 5/02 29/889 |
| 2011/0044816 A1 * | 2/2011 | Lecuyer | ................ | F01D 5/027 29/889.21 |
| 2011/0078901 A1 | 4/2011 | Glasspoole et al. | | |
| 2013/0086805 A1 * | 4/2013 | Pronovost | ................ | F01D 5/02 29/889.23 |
| 2018/0313367 A1 * | 11/2018 | Drevs | ................ | F04D 29/662 |

FOREIGN PATENT DOCUMENTS

EP 2169181 A2 3/2010
WO 20130158483 A1 10/2013

* cited by examiner

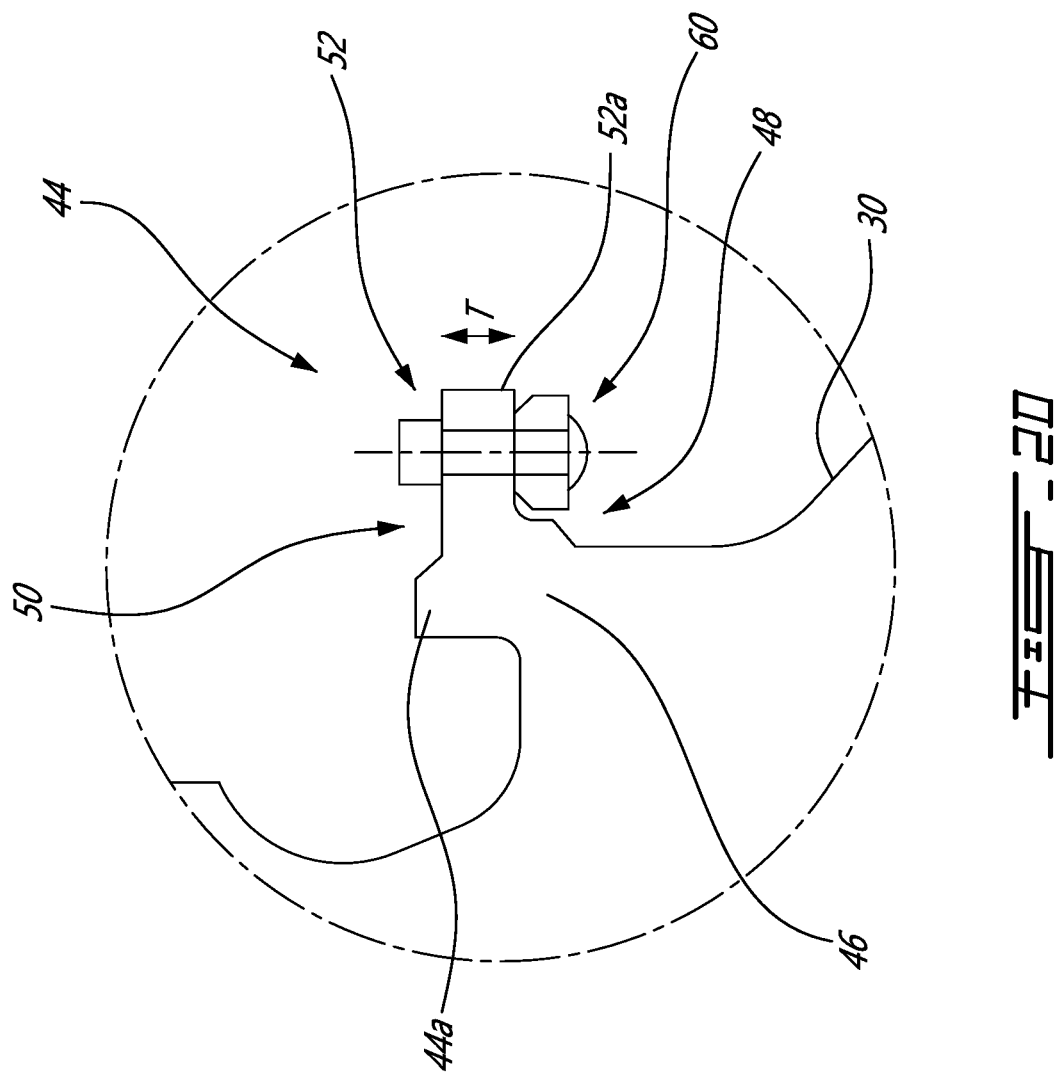

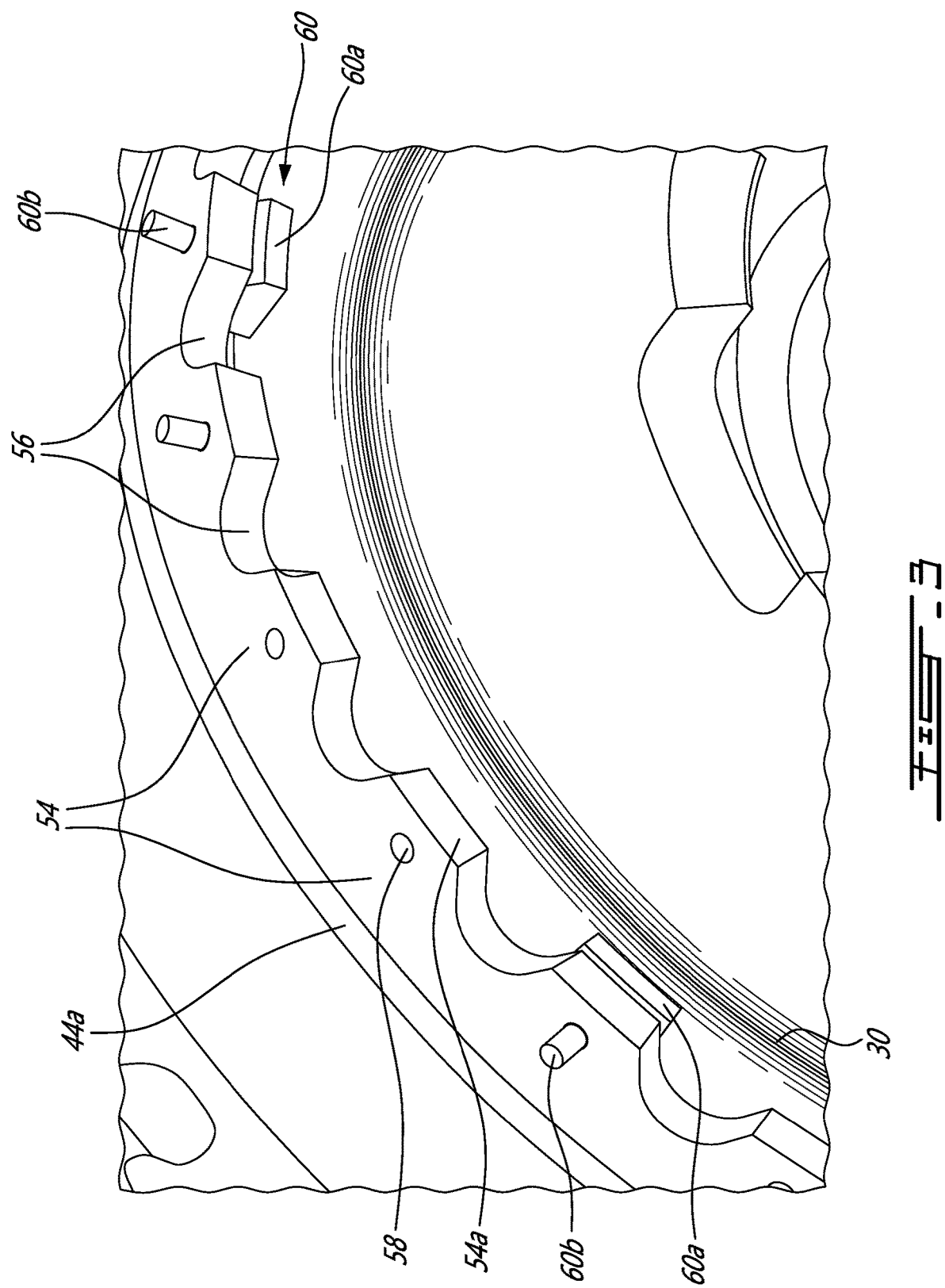

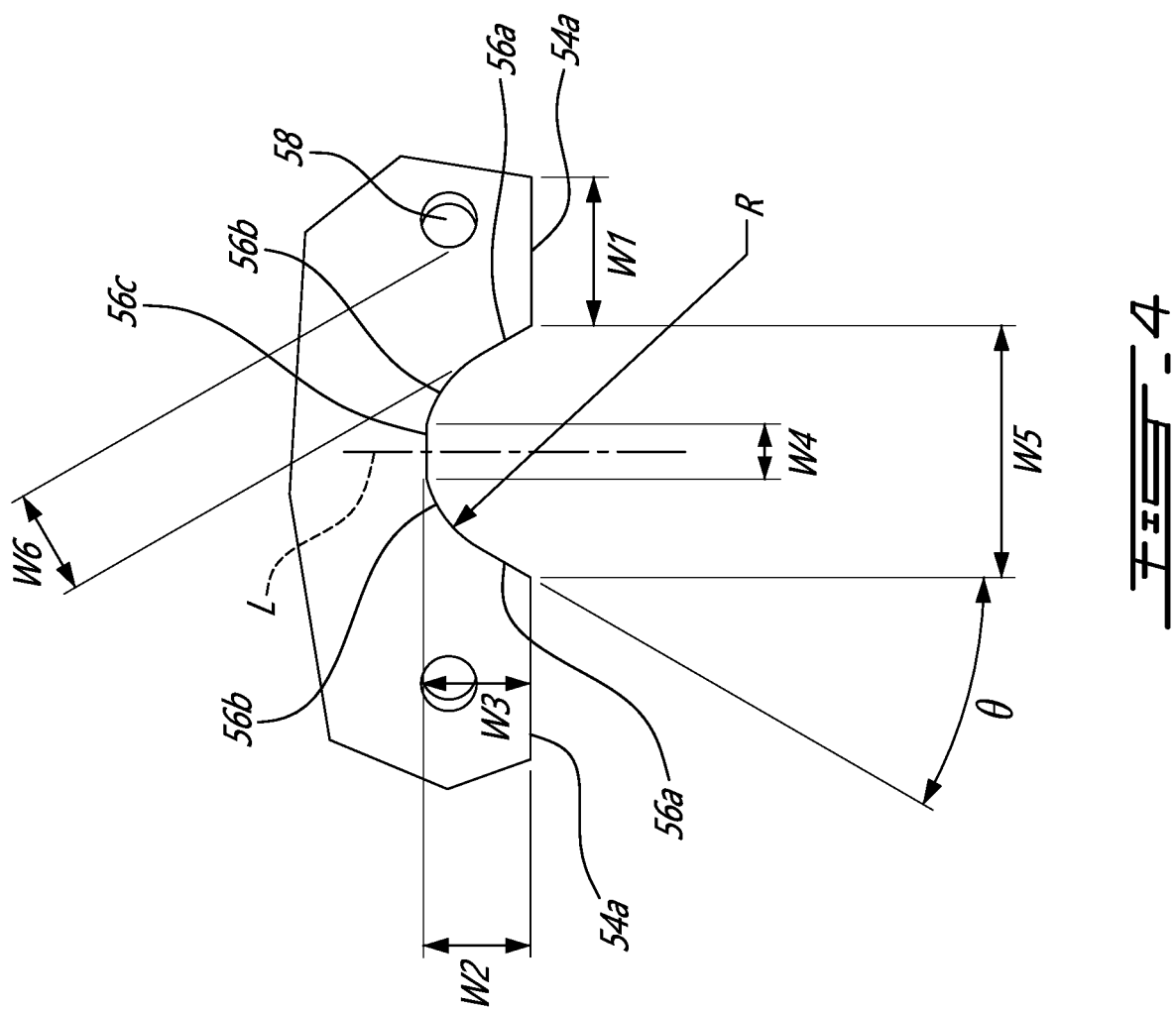

ROTOR BALANCE ASSEMBLY

TECHNICAL FIELD

The disclosure relates generally to rotors for gas turbine engines and, more particularly, to balancing features for such rotors.

BACKGROUND

Gas turbine engines typically must pass stringent vibration tests following their production. Rotor eccentricities are a main source of engine vibration, and eccentricities can be alleviated by rotor balancing. Examples of how rotors are balanced without compromising their structural integrity include oversizing a part of the rotor disk, often referred to as a sacrificial balance appendage, rim or flange, and then either adding balancing weights or selectively removing material from that part.

Common techniques for adding balancing weights are typically employed on rotors spinning at lower speeds, rendering such techniques inappropriate for higher RPM applications due to the various stresses incurred. Common selective material removal techniques may be employed for rotors spinning at higher speeds, for instance at approximately 50,000 RPM or higher. However, as such techniques require material to be grinded or otherwise removed from the rotor after it is mounted for proper balancing, there are risks of metal being trapped in the surrounding components, potentially causing secondary damage to the rotor.

SUMMARY

In one aspect, there is provided a rotor assembly for a gas turbine engine comprising: a rotor including a rotor disc rotatable about a central axis, the rotor having a pair of opposite axially facing faces; an annular flange protruding axially from one of the opposite axially facing faces, the annular flange having a circumference disposed about the central axis, the annular flange including: a plurality of protrusions axisymmetrically disposed about the circumference of the annular flange, each protrusion extending axially from a base portion of the annular flange to a respective protrusion end, each protrusion having a mounting aperture for selectively receiving a balancing feature; and a plurality of slots axisymmetrically disposed about the circumference of the annular flange between adjacent protrusions, each slot including a pair of converging flat portions extending axially inwardly from an adjacent protrusion end, an inner flat portion at an inner end of each slot, and a pair of curved portions respectively joining each converging flat portion to the inner flat portion in each slot; wherein each slot has a slot depth extending normally from the adjacent protrusion end to the inner flat portion of the slot, said slot depth at least as great as an adjacent mounting aperture depth extending normally from the adjacent protrusion end to a far end of the corresponding mounting aperture.

In another aspect, there is provided a rotor assembly for a gas turbine engine comprising: a rotor including a rotor disc rotatable about a central axis, the rotor having a pair of opposite axially facing faces; a pair of annular flanges, each annular flange protruding axially from one of the opposite axially facing faces, each annular flange having a circumference disposed about the central longitudinal axis, each annular flange including: a plurality of protrusions axisymmetrically disposed about the circumference of the annular flange, each protrusion extending axially from a base portion of the annular flange to a respective protrusion end, each protrusion having a mounting aperture for selectively receiving a balancing feature; and a plurality of slots axisymmetrically disposed about the circumference of the annular flange between adjacent protrusions, each slot including a pair of converging flat portions extending axially inwardly from an adjacent protrusion end, an inner flat portion at an inner end of each slot, and a pair of curved portions respectively joining each converging flat portion to the inner flat portion in each slot; wherein each slot has a slot depth extending normally from the adjacent protrusion end to the inner flat portion of each slot and measuring between 0.130 and 0.140 inches; and wherein each slot has a slot width taken between adjacent protrusion ends and measuring between 0.300 and 0.340 inches.

In a further aspect, there is provided a rotor assembly for a gas turbine engine comprising: a rotor including a rotor disc rotatable at a rotational operation speed about a central axis and a rotor disc cover plate mounted to the rotor disc; a pair of annular flanges, a first annular flange protruding axially from the rotor disc in a first direction parallel to the central axis, a second annular flange protruding axially from the rotor disc cover plate in a second direction parallel to the central axis opposite the first direction, each annular flange having a circumference disposed about the central axis, each annular flange having a radial thickness with reference to the central axis, each annular flange having a middle radius defined by a radial distance between the central axis and a midpoint of each annular flange along the radial thickness, each annular flange including: a plurality of protrusions axisymmetrically disposed about the circumference of the annular flange, each protrusion extending axially from a base portion of the annular flange to a respective protrusion end, each protrusion having a mounting aperture for selectively receiving a balancing feature; and a plurality of slots axisymmetrically disposed about the circumference of the annular flange between adjacent protrusions, each slot including a pair of converging flat portions extending axially inwardly from a respective protrusion end and a pair of curved portions meeting at an inner end of each slot, the pair of curved portions respectively joining each converging flat portion to the inner end of each slot; wherein the middle radius of each annular flange multiplied by the square of the rotational operation speed of the rotor disc divided by the radial thickness of each annular flange is approximately forty-five billion.

BRIEF DESCRIPTION OF THE DRAWINGS

Reference is now made to the accompanying figures in which:

FIGS. 2A-2D are respective front perspective, rear perspective, side schematic and enhanced side schematic views of a rotor assembly according to an embodiment of the present disclosure;

FIG. 3 is a perspective view of an annular balance flange for the rotor assembly of FIGS. 2A-2D; and FIG. 4 is an enhanced top view of a portion of the annular balance flange of FIG. 3.

DETAILED DESCRIPTION

Figure 1:
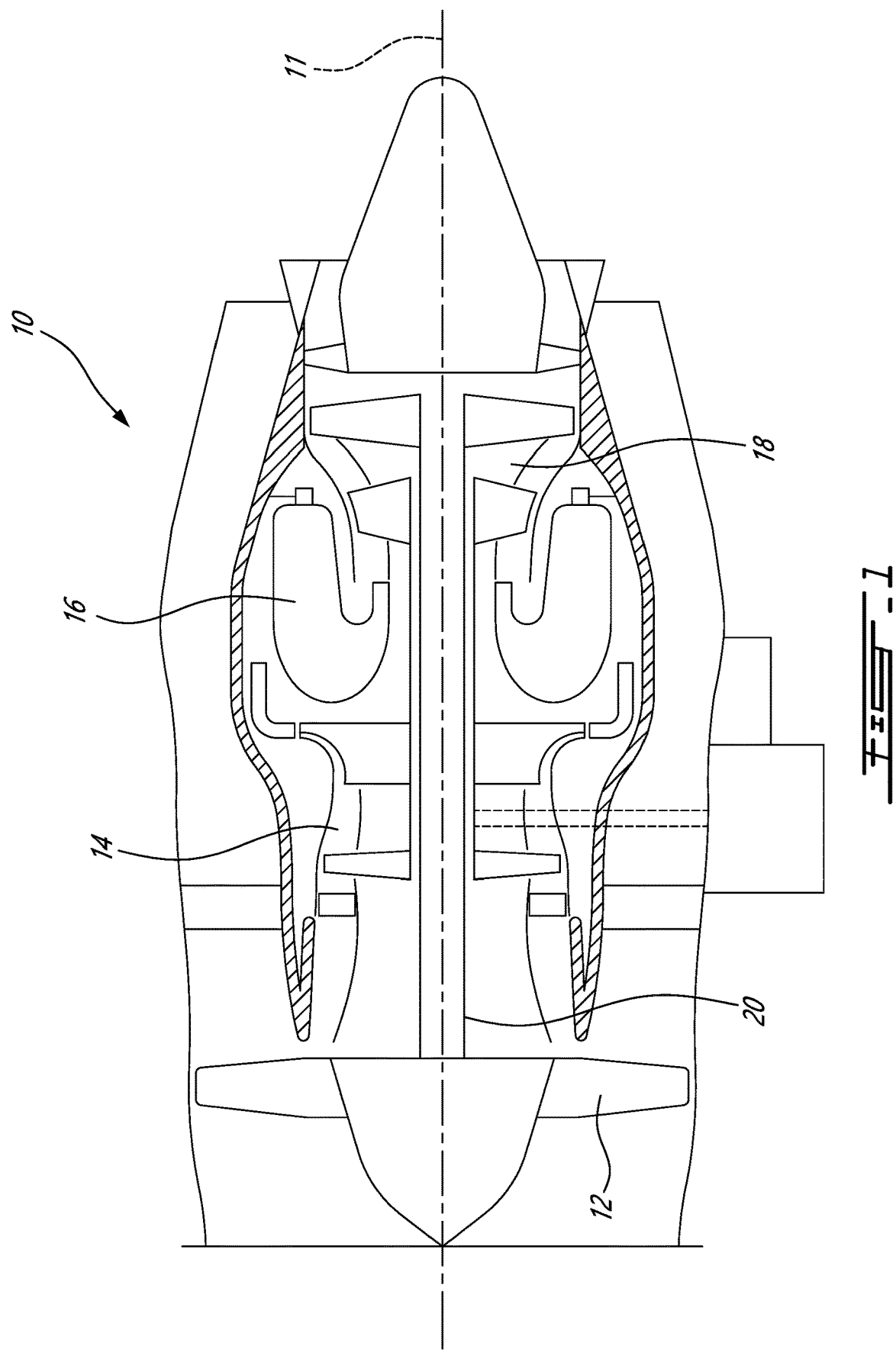
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A shaft 20 interconnects the fan 12, the compressor section 14 and the turbine section 18. While FIG. 1 shows gas turbine engine 10 to be a turbofan gas turbine engine, it is understood that the present disclosure is applicable to other types of gas turbine engines as well.

Referring to FIGS. 2A-4, a rotor assembly 22 which can be used in the gas turbine engine 10 of FIG. 1 or in any adequate type of gas turbine engine 10 is shown. The rotor assembly 22 is operable for rotation about a central axis 11. In the shown embodiment, the rotor assembly 22 is a high pressure turbine (HPT) stage of a multistage turbine section 18 rotating at around 50,000 RPM or higher. However, it is understood that the present disclosure may be applicable to other rotors within a gas turbine engine, as will be discussed in further detail below.

Figure 2A:
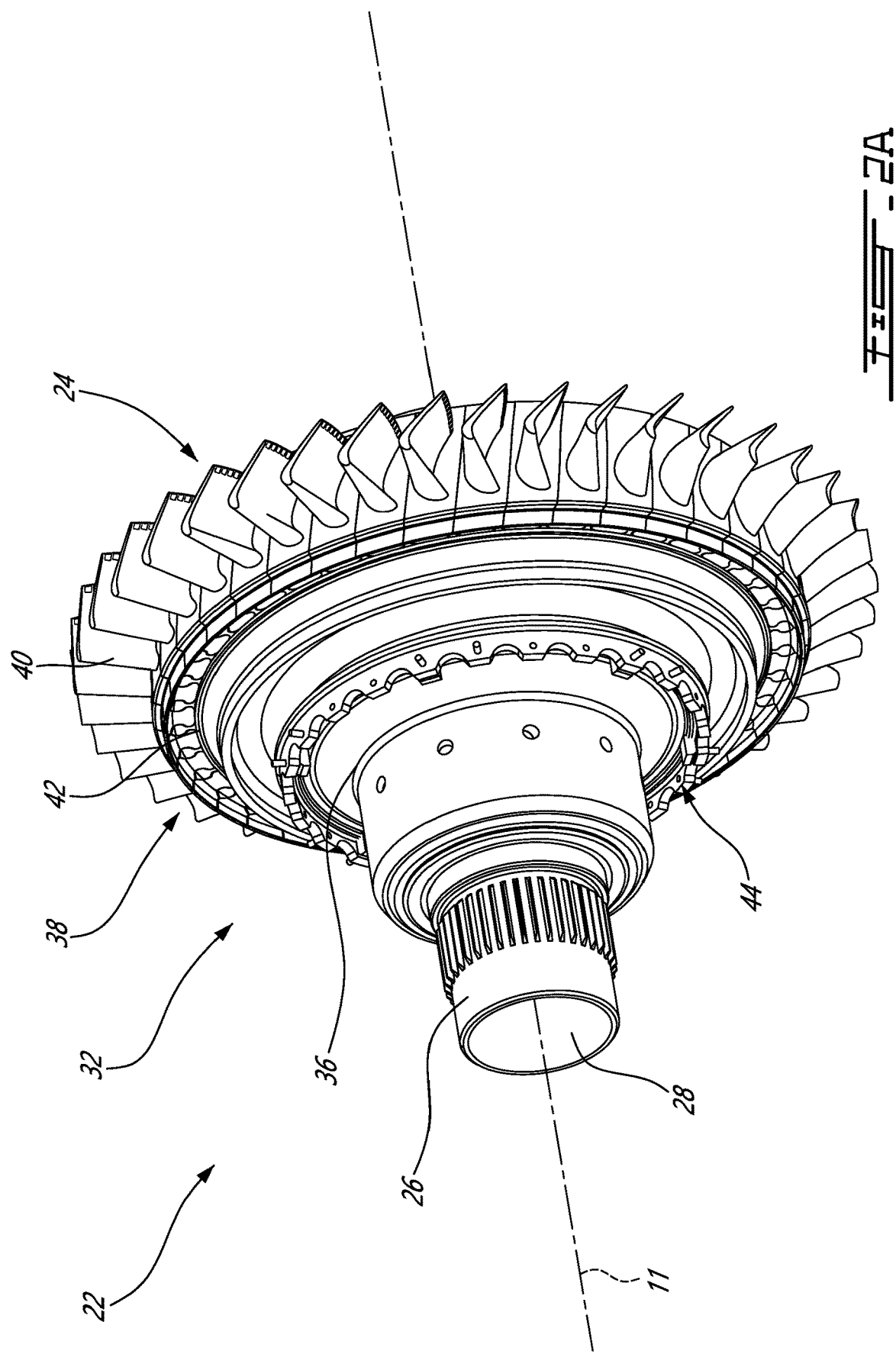
Figure 2B:
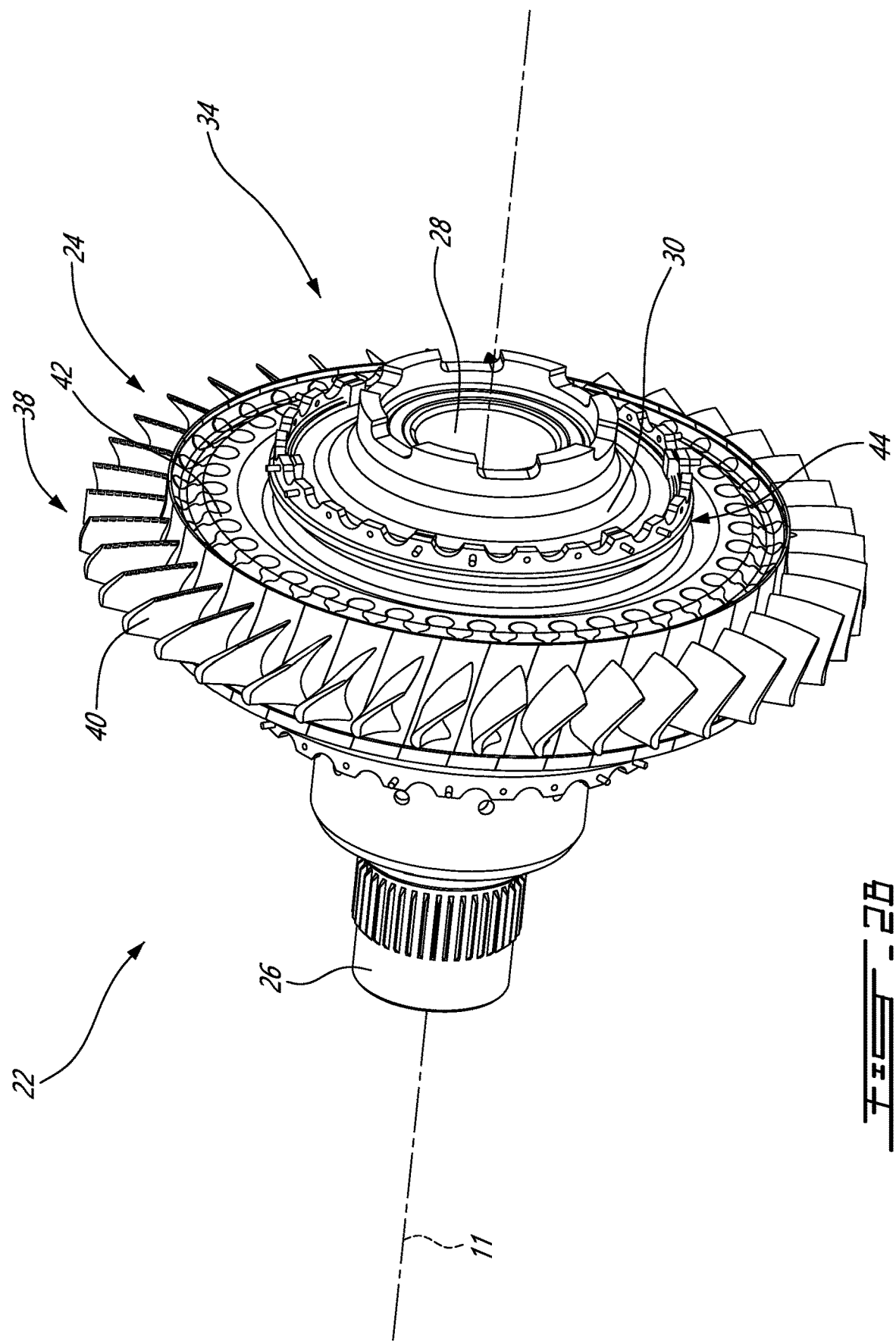
Figure 2C:
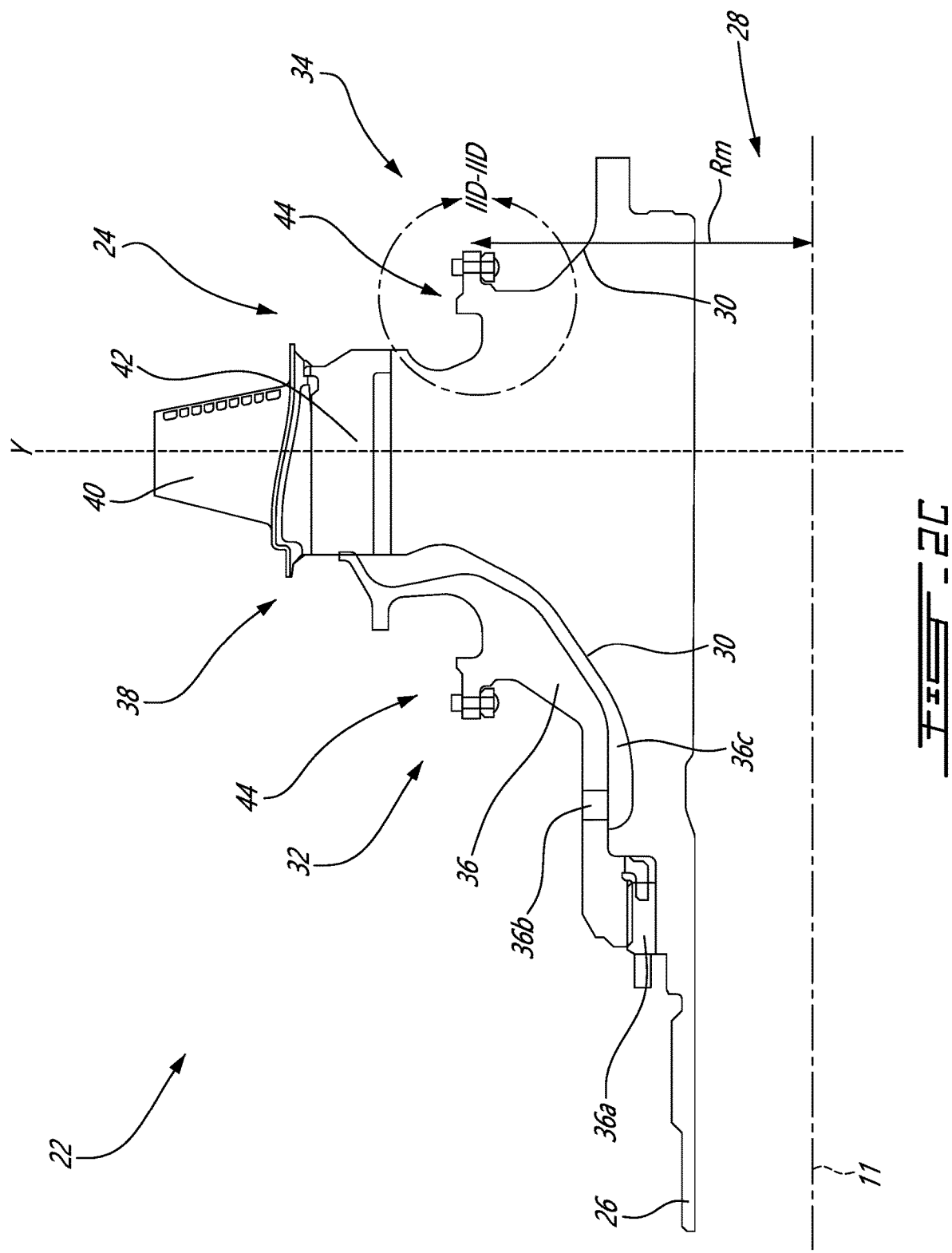

The rotor assembly 22 includes a rotor having a rotor disc 24 to be mounted around a drive shaft 20 (shown in FIG. 1). The rotor includes a hub portion 26 having a central bore 28 through which the drive shaft 20 is inserted. The rotor includes a frustoconical web portion 30 extending generally radially from the hub portion 26. The rotor also has two opposite axially facing faces 32, 34 with reference to a rotor disc axis Y normal to the central axis 11. Opposite faces 32, 34 may be referred to as the first opposite face 32 and the second opposite face 34. In the shown embodiment, although not necessarily the case in all embodiments, the rotor includes a rotor disc cover plate 36 mounted to the first opposite face 32, although other configurations may be contemplated as well. As can be seen in FIG. 2C, the rotor disc cover plate 36 is mounted in front of the first opposite face's 32 web portion 30, for instance via fasteners 36a or other mounting hardware, while the web portion 30 is exposed on the second opposite face 34. In other cases where the rotor disc cover plate 36 is not present, the web portions 30 are exposed on both the first opposite face 32 and the second opposite face 34.

The rotor includes an outer periphery portion 38 encircling the web portion 30. The hub portion 26, the web portion 30 and the outer periphery portion 38 in the illustrated example are made integral with each other and form a monolithic piece, while the shown rotor disc cover plate 36 is mountable to the rotor, for instance via fasteners 36a. The monolithic rotor can be made of a single material. Other rotor disc constructions may be contemplated as well.

According to one or more embodiments, the rotor assembly 22 includes a plurality of circumferentially-disposed and radially extending blades 40 mounted in corresponding blade-receiving slots 42 provided in the outer periphery portion 38 for receiving roots of the blades 40. The number of blades 40 may vary, for instance based on the type of rotor assembly 22 or the type of engine 10. The slots 42 are designed to prevent the blades 40 from being ejected radially during rotation. Other components (not shown), such as fixing rivets, spring plates, etc., may be provided in the rotor assembly 22, depending on the design. In other cases, blades 40 that are made integral with the rotor, i.e. forming a monolithic assembly, may be contemplated as well. In the shown case, the rotor disc cover plate 36 includes an inlet 36b (FIG. 2c) to provide a cooling flow to the blades 40 through an annular cooling channel 36c between the rotor disc cover plate 36 and the corresponding web portion 30. Other methods for cooling the blades 40 may be contemplated as well.

The illustrated rotor assembly 22 has two rotor balancing assemblies each including an annular flange or circular and scalloped appendage 44, one on each opposite face 32, 34. Each flange 44 is coaxially disposed with reference to the central axis 11 and may also be referred to as a balancing flange or rim. As such, such flanges 44 may be referred to as 'horizontal balancing rims', and the combination of the two flanges 44 may be referred to as a 'two-plane balancing system'. Although the illustrated example shows two flanges 44, in other cases it is possible to provide only one instead of two. Such a sole flange 44 could then be on either face opposite 32 or 34. It is also possible to provide two or more flanges 44 on one side and none or a different number on the other side.

According to one or more embodiments, the two flanges 44 are opposed relative to the rotor disc axis Y spanning through a midpoint of the outer periphery portion 38, yet are identical in size and shape. As such, they may be referred to as 'like' flanges 44. In other cases, any flange 44 on one side may not necessarily need to be identical in size and/or in shape compared to any flange on the other side. In the shown case, the flange 44 on the first opposite face 32 protrudes or projects generally longitudinally forward or axially relative to the central axis 11 from the rotor disc cover plate 36 while the flange 44 on the second opposite face 34 protrudes or projects generally longitudinally aft or axially from the web portion 30. In other cases, for instance where the rotor assembly 22 does not include a rotor disc cover plate 36, the flange 44 on the first opposite face 32 may protrude longitudinally forward from the web portion 30.

As best shown in FIG. 2D, each flange 44 comprises a base portion or root 46 that can be integrally connected to the web portion 30 or the cover plate 36, respectively, thereby being part of the rotor disc 24 or the cover plate 36. In other cases, the flange 44 may be positioned elsewhere on the rotor, for instance on the outer periphery portion 38 or on the hub portion 26. Other positions may be contemplated as well. The base portion 46 of each flange 44 is circumferentially continuous. In other cases, the flanges 44 may be connected to the rest of the rotor without being made integral thereto. For example, a flange 44 could be connected by welding or brazing, by using fasteners, etc. The shown flanges 44 each have an inboard surface 48 and an outboard surface 50 and extend from the base portion 46 at the web portion 30 to a free or aft end 52. As will be discussed in further detail below, each flange 44 may be operable to form a generally annular portion of the rotor where internal stresses during operation of the engine 10 will be below a given crack propagation threshold. Each flange 44 may include a raised shoulder 44a towards the base portion 46 on the outboard surface 50, for instance to provide additional support when the weights are added.

As shown in FIG. 3, each flange 44 includes a plurality of circumferentially spaced-apart protrusions or fingers 54 at their free end 52. These protrusions 54 are the locations at which weights can be added to the rotor assembly 22 for balancing purposes, as will be discussed in further detail below. The protrusions 54 project or extend substantially axially from the base portion 46 of the corresponding flange 44 and terminate at protrusion ends 54a along the free end 52 of the flange 44. The protrusions 54 are axisymmetrically disposed with reference to the central axis 11 and are substantially identical. As such, they may be referred to as 'like' protrusions 54. The size and shape of the protrusions 54 and their effects on balancing the rotor assembly 22 will be discussed in further detail below. In the shown case, each flange 44 includes twenty-four protrusions 54, although other numbers of protrusions 54 may be contemplated as well.

The protrusions 54 are delimited circumferentially by a plurality of axisymmetrically spaced-apart stress-relieving slots 56, also referred to as scallop-shaped cutouts or recesses. These slots 56 are operable to relieve various stresses relating to, for instance, the weight added to the protrusions 54 for balancing purposes and the rotational forces acting upon the rotor assembly 22 in use. In the shown case, the slots 56 are formed on a radially-extending end face 52a at the free end 52 of the flange 44. In the shown case, the slots 56 are substantially identical to each other, and thus may be referred to as 'like' slots 56. Each of the slots 56 has an internal wall with a shape or slope minimizing the stress concentration within the slot 56, as will be discussed in the further detail below.

Illustratively, referring to FIG. 4, each slot includes a pair of converging flat portions 56a, a pair of curved portions 56b, and an inner flat portion 56c at an inner end of each slot 56. The converging flat portions 56a extend axially inwardly from an adjacent protrusion end 54a. The pair of curved portions 56b respectively join each converging flat portion 56a to the inner flat portion 56c in each slot 56. The slots 56 are designed so as to reduce various internal stresses such as hoop stresses caused by the rotation of the rotor assembly 22 in operation, which may extend the life expectancy of the various components. When manufacturing the rotor assembly 22, the slots 56 may be machined in the free end 52 of each flange 44, for instance by using a rotating tool or another technique. Such machining of the slots 56 thus forms the protrusions 54. Each slot 56 in the illustrated example is oriented substantially radially with reference to the central axis 11.

In another embodiment, each slot 56 includes a pair of converging flat portions 56a extending axially inwardly from a respective protrusion end 54a and a pair of curved portions 56b meeting at an inner end of each slot 56. The pair of curved portions 56b respectively join each converging flat portion 56a to the inner end of each slot 56. As such, in this embodiment, although not necessarily the case in other embodiments, the slots 56 would not include end flat portions 56c. Other arrangements for each slot 56 may be contemplated as well.

As shown in FIG. 3, each protrusion 54 includes a hole or mounting aperture 58 for the attachment of a balancing feature 60. In the shown case, the balancing feature 60 includes a balancing weight 60a and a fastener 60b, illustratively a rivet, although other forms for the balancing feature 60 may be contemplated as well. For instance, an exemplary balancing feature 60 may include a weighed portion with an attached and protruding threaded portion. As such, while in the shown case the mounting apertures 58 are smooth and cylindrically-shaped for receiving the rivets 60b, in other cases they may be threaded for engaging with a fastener-type balancing feature. As will be discussed in further detail below, the slots 56 are operable to relieve various stresses within the mounting apertures 58 caused by, for instance, the weight of the balancing features 60.

As discussed above, in the shown case each flange 44 includes twenty-four protrusions 54 and thus twenty-four mounting apertures 58. For a typical balancing operation, a given flange 44 may be maximally rated to carry the heaviest available balancing weights 60a in one third of the mounting apertures 58. In the shown case, each flange would be rated to support at most eight of the heaviest available balance weights 60a. A variety of differently-weighted balancing weights 60a may be available to accurately balance the rotor assembly 22. In some cases, the various balance weights 60a may have the same cross-sectional profile and differ in their lengths.

In an exemplary balancing operation, the weight distribution of the rotor assembly 22 may be tested through various techniques once it is mounted to the gas turbine engine 10. For instance, a computer-operated apparatus (not shown) may spin the rotor assembly 22, detect and localize any imbalances, and propose remedies for the imbalances. Such remedies may include adding one or more balancing features 60 to the balancing flange(s) 44 to achieve a desired weight distribution. The balancing features 60 may be secured to the balancing flange via fasteners, for instance rivets 60b, to prevent detachment during engine operation. Other techniques for determining the optimal placement of the balancing features 60 may be contemplated as well.

As discussed above, the flanges 44, in particular the protrusions 54 and slots 56, are dimensioned to relieve various stresses incurred by various portions of each flange 44. Such stresses may include stresses due to the rotation of the rotor assembly 22, hoop stresses in the mounting apertures 58 and bending stresses at the base portion 46 on the outboard surface 50 due to the cantilevered weight of the balancing features 60. As can be seen in FIG. 4, the slot 56 is symmetric about a slot longitudinal axis L, such axis L in line with the protruding flange 44. In various embodiments, a plurality of parameters may be set so that the flanges 44 may offer a counterweight-based balance system for the rotor assembly 22 rotating at high speeds, for instance around 50,000 RPM or higher, while reducing the overall weight of the rotor assembly 22 and satisfying various life requirements of the rotor. In addition, the slots 56 may aid in breaking up or distributing the thermal stresses incurred by the rotor assembly 22. Such parameters may include, but are not limited to, the radial thickness T of the flange 44 with respect to the central axis 11, the radius R of the curved portions 56b of each slot, the width W1 of the protrusion ends 54a, the depth W2 of each slot 56, the depth W3 of each mounting aperture 58, the width W4 of each inner flat portion 56c, the width W5 of each slot 56 taken between adjacent protrusion ends 54a, the distance W6 from the edge of each slot 56 to the edge of the nearest mounting aperture 58, and the angle of entry θ of each converging flat portion 56a relative to the axis L. Other parameters to define the flanges 44 may be contemplated as well.

In one or more embodiments, such parameters may be defined by measurement ranges with various tolerances. Such ranges offer a balance between minimizing the hoop stresses within the mounting apertures 58, thus extending the life expectancy of the rotor, without adding an excessive amount of cantilevered stress in creating the slots 56. In addition, the removal of material to create the slots 56 lowers the overall weight of the rotor assembly 22. Such measurements may be applied to a flange 44 having a radius of approximately 2.1 inches with reference to the central axis 11. In such an embodiment, the thickness T of each flange 44 measures approximately 0.115 inches. The radius R of the curved portions 56b measures between 0.105 and 0.145 inches. The width W1 measures approximately 0.270 inches. The depth W2 of each slot 56 should generally correspond to at least the depth W3 of each mounting aperture 58 (i.e. the distance between the protrusion end 54a and the furthest point on the corresponding in-line mounting aperture 58) and measure between 0.130 and 0.140 inches.

The width W5 of each slot 56 measures between 0.300 and 0.340 inches. The minimum distance W6 between the edge of each slot 56 to the edge of the nearest mounting aperture 58 is approximately 0.085 inches. The angle of entry θ of each converging flat portion 56a relative to the axis L is approximately 30 degrees, with a tolerance of plus or minus 10 degrees. The angle of entry θ of each converging flat portion 56a relative to the axis L is approximately 30 degrees, with a tolerance of plus or minus 10 degrees. Preferably, the angle of entry θ of each converging flat portion 56a relative to the axis L is approximately 30 degrees, with a tolerance of plus or minus 1 degree. Such an angle allows the width W1 to be sufficient to support the various sizes of balancing weights 60a that may be mounted to each protrusion 54. In various cases, the protrusion end 54a may reduce the concentrated stresses at the inner ends of the cutouts 56. In addition, the angle of entry θ allows more material to be removed when forming each slot 56 (relative to a zero degree entry relative to the slot longitudinal axis L), further reducing the overall weight of the rotor assembly 22. Unless otherwise stated, the above-listed measurements have a tolerance within 0.010 inches. Other parameters may be contemplated as well.

In another embodiment, the relationship between a number of the above-listed parameters may be described as ratios. Such ratios may complement the measurements listed in the above embodiment. In other cases such ratios may be utilized to scale up or down the design of the flanges 44 for a different-sized rotor operating under similar conditions, i.e. rotating at high speeds in the order of 50,000 RPM. In such an embodiment, the depth W2 of each slot 56 should generally correspond to at least the depth W3 of each mounting aperture, and the radius R of each curved portion 56b should approximately correspond to the depth W2 of each slot 56. The angle of entry θ of each converging flat portion 56a relative to the axis L is approximately 30 degrees, with a tolerance of plus or minus 10 degrees. Preferably, the angle of entry θ of each converging flat portion 56a relative to the axis L is approximately 30 degrees, with a tolerance of plus or minus 1 degree. The width W4 of each inner flat portion 56c is at least one tenth of the depth W2 of each slot 56. The thickness T is at least eighty-five percent as great as the depth W2 of each slot 56. In some cases, the width W1 of the protrusion ends 54a may vary, for instance to increase or decrease the number of protrusions 54 and slots 56. Other relationships between the various parameters may be contemplated as well.

Additionally or alternatively, a relationship can be identified between the thickness T of each flange 44, a middle radius Rm of each flange 44 (i.e. the distance between the central axis 11 and the midpoint of the each flange 44 along the thickness T), and the rotational operation speed w of the rotor assembly 22:

$$\frac{Rm * \omega^2}{T} \approx 4.5 * 10^{10}$$

Through this relationship, the parameters of the flange 44 may be scaled up or down to accommodate varying sizes of rotor assemblies 22 rotating at different speeds. Other relationships may be contemplated as well. For instance, there is an inverse relationship between the number of protrusions 54 and the radius R of the curved portion 56b of each slot 56. In the shown case, the flanges 44 have a lower number of protrusions 54 (twenty-four) compared to a balance flange of a similarly-sized rotor rotating at slower speeds which does not incur the same stresses. However, by reducing the number of protrusions 54, the radius R can be increased, thus reducing the overall stresses incurred in the flange 44.

In various cases, the above-described ratios, dimensions and relationships may be used independently of each other or used to complement each other. In addition, in different embodiments, a flange 44 may respect certain ratios, dimensions and/or relationships and not others. Various combinations of the above may be contemplated.

Various materials and machining and assembly techniques may be employed in forming the rotor assembly 22. The rotor disc 24, flanges 44 and cover plate 36 may be made from various nickel alloys, although other materials may be contemplated as well. The flanges 44, and in particular the slots 56 and mounting apertures 58 may be formed through various processes such as peening, milling, turning and drilling, although other techniques may be contemplated as well. In the shown case, the balancing weights 60a are mounted to the flanges 44 via rivets passing through the mounting apertures 58 in the protrusions 54, although other fastening techniques may be contemplated as well.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A rotor assembly for a gas turbine engine comprising:
   a rotor including a rotor disc rotatable about a central axis, the rotor having a pair of opposite axially facing faces;
   an annular flange protruding axially from one of the opposite axially facing faces, the annular flange having a circumference disposed about the central axis, the annular flange including:
      a plurality of protrusions axisymmetrically disposed about the circumference of the annular flange, each protrusion extending axially from a base portion of the annular flange to a respective protrusion end, each protrusion having a mounting aperture for selectively receiving a balancing feature; and
      a plurality of slots axisymmetrically disposed about the circumference of the annular flange between adjacent protrusions, each slot including a pair of converging flat portions extending axially inwardly from an adjacent protrusion end, an inner flat portion at an inner end of each slot, and a pair of curved portions respectively joining each converging flat portion to the inner flat portion in each slot, wherein each of the converging flat portion forms an angle ranging from twenty to forty degrees with respect to a slot longitudinal axis in line with the annular flange;
      wherein each slot has a slot depth extending normally from the adjacent protrusion end to the inner flat portion of the slot, said slot depth at least as great as an adjacent mounting aperture depth extending normally from the adjacent protrusion end to a far end of the corresponding mounting aperture.

2. The rotor assembly as defined in claim 1, wherein the curved portions of each slot each have a radius approximately equal to the slot depth.

3. The rotor assembly as defined in claim 1, wherein the inner flat portion of each slot has a width that is at least one tenth as great as the slot depth.

4. The rotor assembly as defined in claim 1, wherein the annular flange has a radial thickness with reference to the central axis that is at least eighty-five percent as great as the slot depth of each slot.

5. The rotor assembly as defined in claim 1, wherein the annular flange includes twenty-four of the plurality of protrusions axisymmetrically disposed about the circumference of the annular flange.

6. The rotor assembly as defined in claim 1, wherein the rotor disc is operable to rotate at a speed of at least 50,000 RPM.

7. The rotor assembly as defined in claim 1, wherein the annular flange protrudes axially in a direction parallel to the central axis from the rotor disc.

8. The rotor assembly as defined in claim 1, wherein the rotor further includes a rotor disc cover plate, wherein the annular flange protrudes axially in a direction parallel to the central axis from the rotor disc cover plate.

9. The rotor assembly as defined in claim 1,
wherein the slot depth measures between 0.130 and 0.140 inches; and
wherein each slot has a slot width taken between adjacent protrusion ends and measuring between 0.300 and 0.340 inches.

10. The rotor assembly as defined in claim 1, wherein the curved portions in each slot each have a radius measuring between 0.105 and 0.145 inches.

11. The rotor assembly as defined in claim 1, wherein the angle ranges from twenty-nine to thirty-one degrees.

12. The rotor assembly as defined in claim 1, wherein each annular flange has a radial thickness with reference to the central axis measuring approximately 0.115 inches.

13. The rotor assembly as defined in claim 1, wherein each protrusion end has a width taken between two adjacent slots measuring approximately 0.270 inches.

14. The rotor assembly as defined in claim 1, wherein each annular flange includes twenty-four of the plurality of protrusions axisymmetrically disposed about the circumference of each annular flange.

* * * * *